United States Patent
Wilke (10) Patent No.: US 7,170,490 B2
(45) Date of Patent: Jan. 30, 2007

(54) METHOD AND APPARATUS FOR LOCATING A POINTING ELEMENT WITHIN A DIGITAL IMAGE

(75) Inventor: Alexis Wilke, Montbeliard (FR)

(73) Assignee: Weather Central, Inc., Madison, WI (US)

( * ) Notice: Subject to any disclaimer, the term of this patent is extended or adjusted under 35 U.S.C. 154(b) by 112 days.

(21) Appl. No.: 10/959,596

(22) Filed: Oct. 6, 2004

(65) Prior Publication Data

US 2005/0195158 A1    Sep. 8, 2005

Related U.S. Application Data

(63) Continuation-in-part of application No. 09/210,525, filed on Dec. 11, 1998, now abandoned.

(51) Int. Cl.
*G09G 5/00* (2006.01)
*G06K 9/00* (2006.01)

(52) U.S. Cl. ...................... 345/157; 382/103

(58) Field of Classification Search ............... 345/156, 345/632, 435; 382/103, 100, 199; 707/3; 348/552; 715/856, 857
See application file for complete search history.

(56) References Cited

U.S. PATENT DOCUMENTS

| | | | | |
|---|---|---|---|---|
| 4,843,568 A | * | 6/1989 | Krueger et al. | 382/100 |
| 5,937,081 A | * | 8/1999 | O'Brill et al. | 382/111 |
| 6,300,955 B1 | * | 10/2001 | Zamir | 382/283 |

* cited by examiner

*Primary Examiner*—Richard Hjerpe
*Assistant Examiner*—Kevin M. Nguyen
(74) *Attorney, Agent, or Firm*—Reinhart Boerner Van Deuren, s.c.

(57) ABSTRACT

A method and apparatus for finding a pointing element within a digital image. A digitized image is received including a background and an object to be tracked. The background and the object have a different color. A rectangle is defined within the image including at least a portion of the object. The defined rectangle is searched to determine the X and Y coordinates of the pointing element.

1 Claim, 10 Drawing Sheets

METHOD AND APPARATUS FOR LOCATING A POINTING ELEMENT WITHIN A DIGITAL IMAGE

This application is a continuation of U.S. patent application Ser. No. 09/210,525 filed on Dec. 11, 1998, now abandoned.

BACKGROUND OF THE INVENTION

What is referred to generically herein as an optical mouse device was first created in 1995 after more than three months of research on how to find a color ball within a video field. One area of particular interest for use of an optical mouse is in television weather broadcasts. The talent, by using an optical mouse, could, for example, move a cloud shown on a display from one position to another by moving a handheld pointing device with a colored ball at its end.

There were two problems:

1. Because the digitalization of a video signal is too far apart from the raw video signal, it is not possible to find a specific color within a full video field.

2. On a system with a slow processor, it is not possible to search the whole image for a single point of color and let another program work in parallel.

Therefore, a way to find the end (or tip) of a person's hand (or of a pointer device) was chosen to bypass the problem. No specific color is necessary to find the end. See U.S. Pat. No. 5,270,820 for a description of this technique.

SUMMARY OF THE INVENTION

In order to work, the optical mouse device needs to analyze images (usually from a camera feed, but it is not limited to just a camera) which has a single background color. Weather broadcasts often have a blue or green background used as a matte, but the invented optical mouse patent does not require any specific background color.

Figure 1:
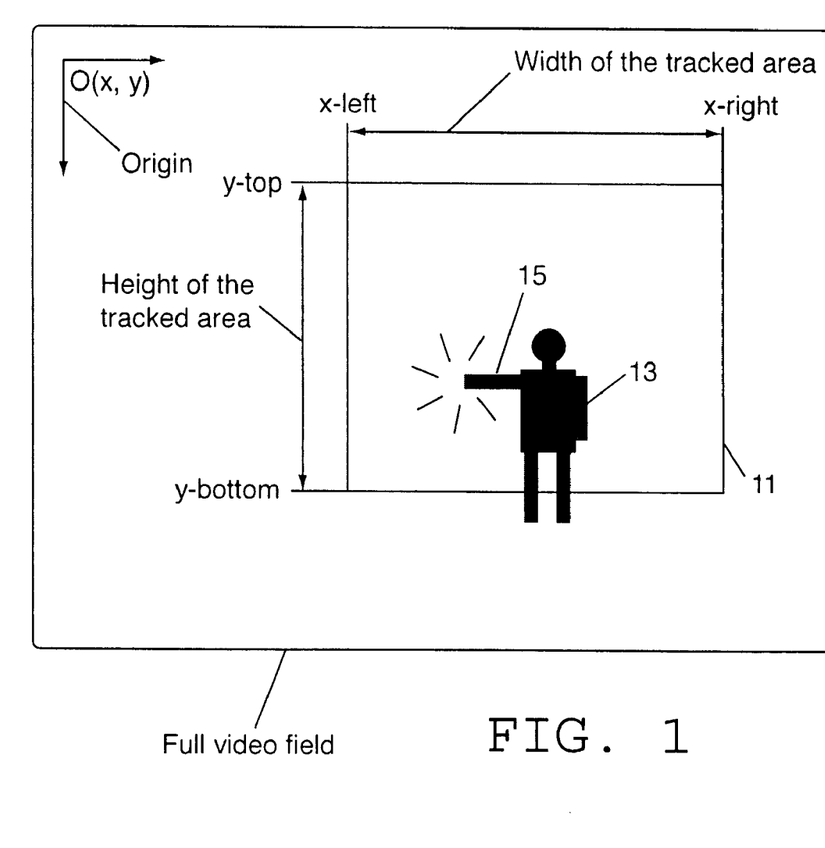
FIG. 1 shows a video field with a background and foreground object.
Figure 2:
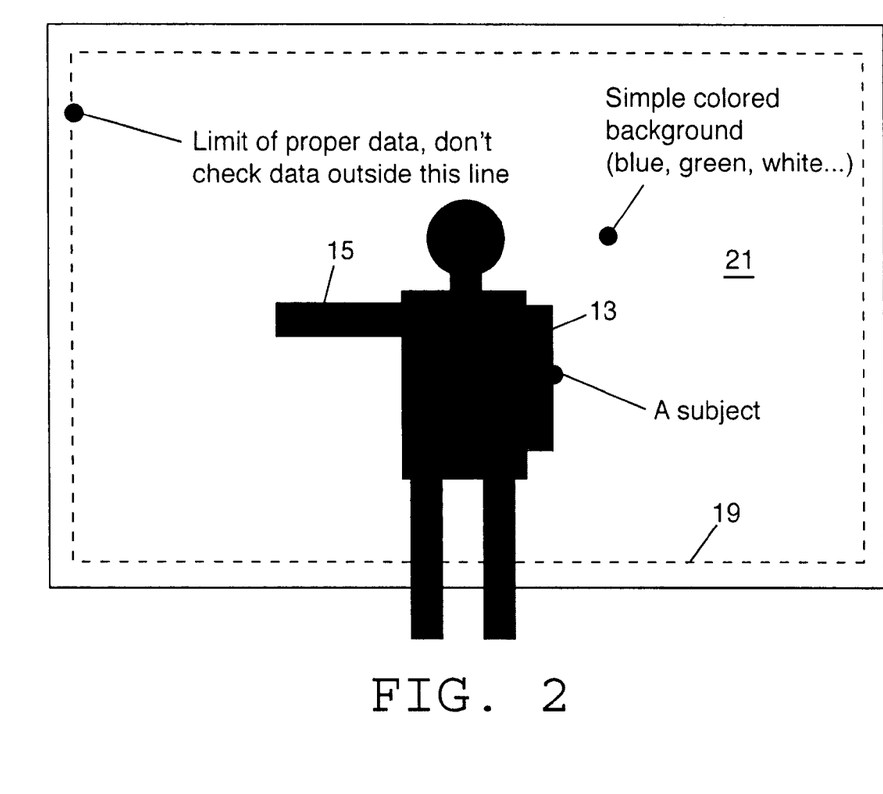
FIG. 2 shows a video field having a limited search area.

The object to be tracked (possibly a person, but it is not limited to just persons, i.e. it could track a robot) will be standing within the received image and will have a different color than the background as shown in FIG. 1 and FIG. 2. The object may have parts using that background color if some areas need to appear transparent through a matte, etc.

When the data is coming to the computer through a video signal, the computer will need a piece of hardware to convert the digital representation of the video signal supported by the optical mouse device. Whatever the format of the images, it will have to be converted to a one component (gray scale) or three components (red, green and blue) format. However, the way those are represented does not make any difference on how the optical mouse works. (FIG. 2.)

Then the device will search an area of the image for a pointing device (optical mouse). The pointing device position will be returned to the user of the device. The explanations found here can be used to search a person standing in front of a camera like, but not limited to, a weather caster. Such a search could work in any direction for any kind of object or person and is valid for any kind of extension.

Figure 3A:
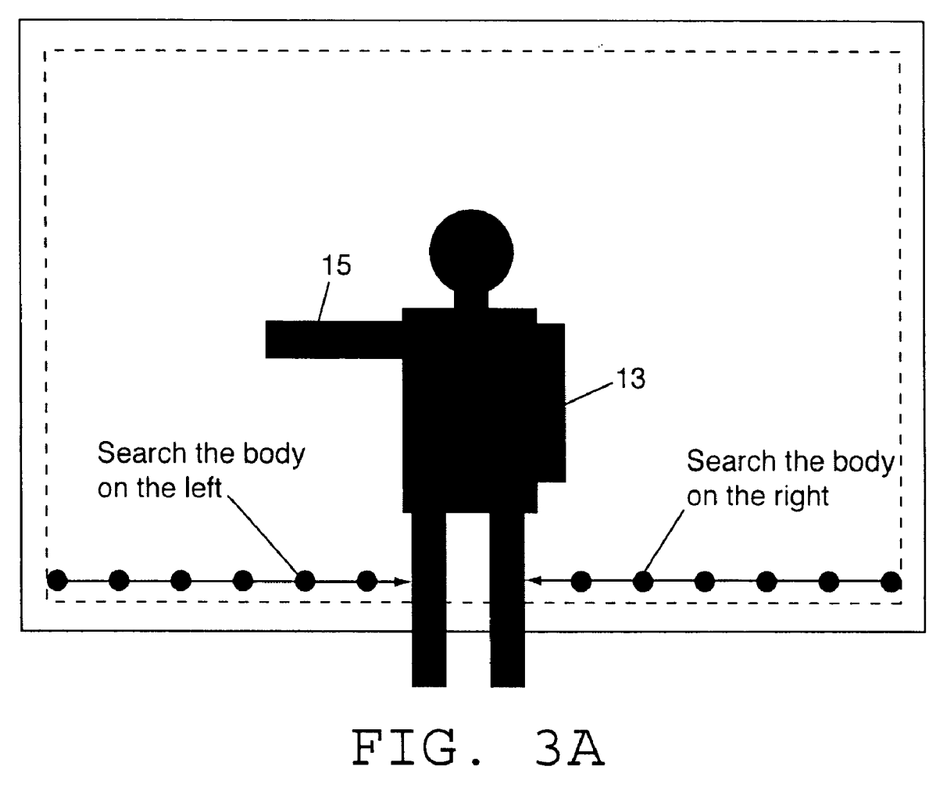
FIG. 3a shows a search for a body portion.

In this specific case, the device starts its search at the bottom of the area where the body of a standing person should always be found (FIG. 3a). There are a few cases explained below when the device may find arms without finding the body of the person first.

Figure 3B:
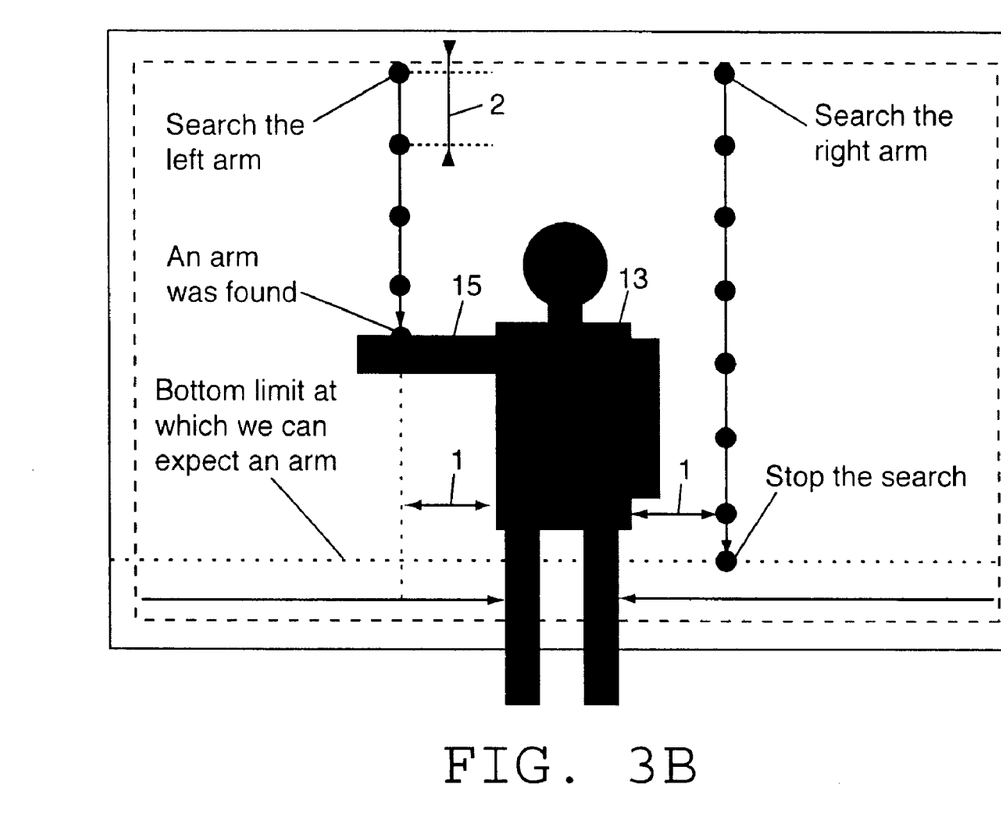
FIG. 3b shows a search for arm portions.

Once the body of the person is found, a search for the arms is conducted (FIG. 3b). To do so, a search is started from the top of the image and continues toward the bottom. If nothing is found, there is no extended arm.

Finally, a search is conducted along the arm up to the tip of the arm, i.e., end of the hand (FIG. 3c) or the pointing device (which will prolong the arm). This last search result is the position which the optical mouse device returns to the user.

Figure 3C:
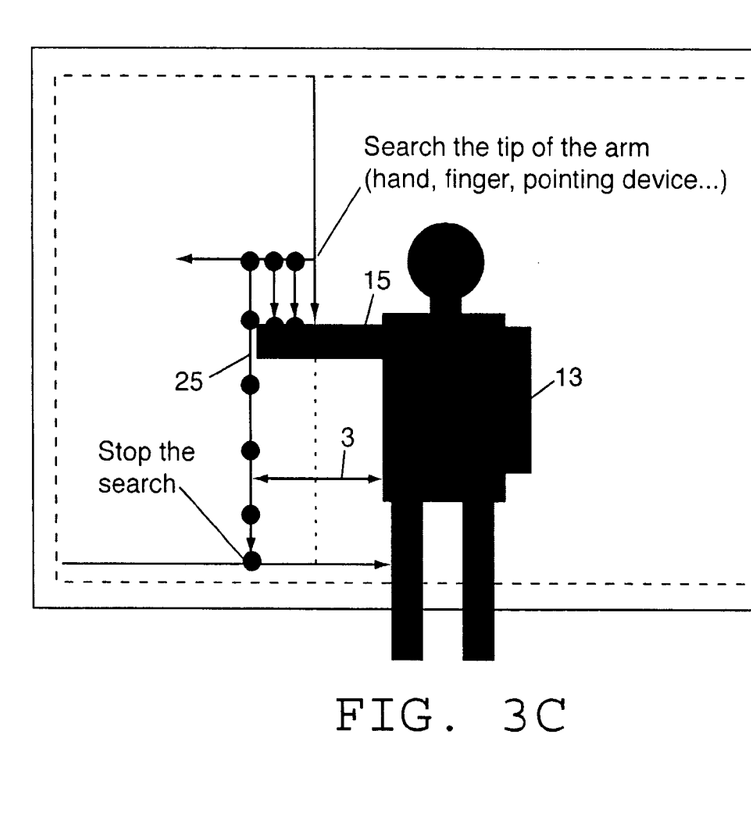
FIG. 3c shows a search for a tip.
Figure 3D:
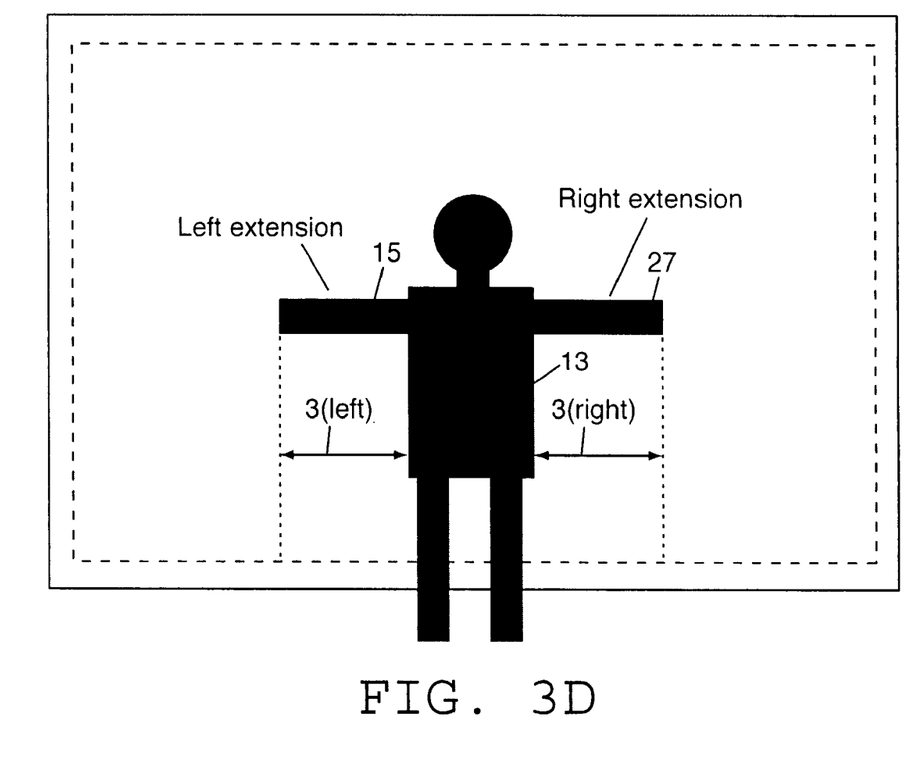
FIG. 3d shows a search for a desired arm portion.

When both arms are extended, one of them must be selected to know which is the one used to point (FIG. 3d). To accomplish this, simply select the one further away from the body: it is known where the body was found (Xb), and where the tip was found (Xt) therefore the distance.vertline.Xb–Xt.vertline. (absolute value of the subtraction of both positions) is also known; the longest distance determines which of the arms is the furthest away. Other methods could be used. Some optical mouse devices could be programmed to always return a position on the left side.

If no arm tip is found, a "no position" is returned.

DETAILED DESCRIPTION OF THE INVENTION

The following is a description of a special case referring to arms. These arms are described as the left arm and the right arm. The 'left' and 'right' words are not referencing the real left arm or right arm of the person standing in the video field. Rather, these are references to the extension seen on the left and the extension seen on the right as presented in the figures. See FIG. 3d.

1. Full Image

The computer needs a source to receive a full digital image. This source can be, and is not limited to: (1) the Internet, (2) a movie or (3) a direct video feed to the computer, in which case the video signal will need to be converted to a digital representation (FIG. 1).

The full image sizes are represented as the variables WIDTH and HEIGHT.

2. Area to be Tracked

The area to be tracked can be any rectangle 11 within the full video field. The definition is (X-LEFT, Y-TOP, X-RIGHT, Y-BOTTOM) in pixel coordinates. These coordinates are used to determine where to search for the body 13 and arms 15 as shown in FIG. 1. The origin of these coordinates is the top-left corner, with the Y coordinates increasing going down and the X coordinates increasing going right.

3. Search Limit

Depending on the type of source, it may be necessary to define a limit 19 to avoid searching near the borders (FIG. 2.), thus limiting problems while searching. Most of the time, a video feed will have artifacts on the border. The search limit can also be generated with a smaller area to be tracked. However, a full image version of the optical mouse may only relate on a search limit.

The limit variable is defined as LIMIT and represents the number of pixels to skip on all borders. Note that four values could be defined to give a specific left, right, top and bottom limit. For the purpose of this discussion, we will limit ourselves to only one value.

4. Background

The background 21 needs to be a single color; i.e. always use the same color. The color will possibly vary in intensity and chroma within a limited range defined by the user.

The color definitions will vary depending on the number of components of the digital representation of the image. Yet, each component can be checked against a range. A range will be defined as MIN for the lowest possible value and MAX for the highest possible value. These ranges may be defined as constants (the background is always of the same color in all the possible cases) or variables (the background can change from one usage to another; i.e. from a blue screen to a green screen).

Here is an algorithm to check if a pixel is of type background in a three component image (red, green and blue):

1—the PIXEL variable is defined as a structure RGB with— three fields: RED, GREEN and BLUE. FUNCTION IS-BACKGROUND (VAR PIXEL:RGB)—check the red pixel—RED-MIN is the minimum accepted red value— RED-MAX is the maximum accepted red value IF PIXEL.RED<RED-MIN OR PIXEL.RED>RED-MAX THEN RETURN FALSE END IF—check the green pixel IF PIXEL.GREEN<GREEN-MIN OR PIXEL.GREEN>GREEN-MAX THEN RETURN FALSE END IF—check the blue pixel IF PIXEL.BLUE<BLUE-MIN OR PIXEL.BLUE>BLUE-MAX THEN RETURN FALSE END IF—if all the tests went through properly, the pixel is—a background pixel RETURN TRUE Example of Ranges:

2 Color Range of the background Red Green Blue Blue 0% to 15% 0% to 30% 75% to 100% Green 0% to 10% 75% to 100% 0% to 40% White 80% to 100% 80% to 100% 80% to 100%

Figure 2A:
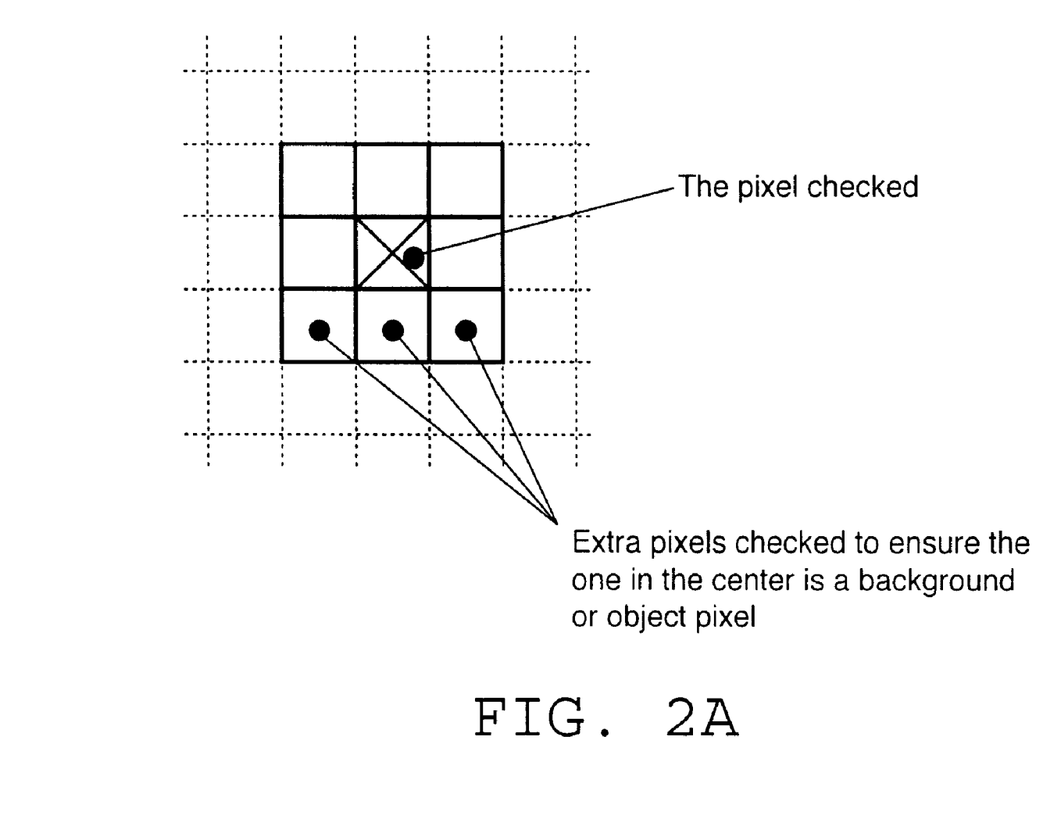
FIG. 2a shows a pixel being checked and its surrounding pixels.

With some optical devices, it will be better to check for more than one single pixel. It is possible to check nine (9) pixels instead of one to make sure it is a background pixel as shown in FIG. 2a. The range used to check the pixels around may vary from the range used to check the middle pixel.

5. Object

On the other hand, the object will be of all the colors which are not the background color. The area to be searched can therefore be defined with a positive (the object) and a negative (the background) set of pixels. A program could be done to transform the whole image in this way. However to make it work in real time, it is necessary to check a very limited number of pixels. The algorithm below shows how this works.

3 FUNCTION IS-OBJECT (VAR PIXEL:RGB)—we return TRUE when IS-BACKGROUND returns FALSE—and vice versa IF IS-BACKGROUND (PIXEL) THEN RETURN FALSE ELSE RETURN TRUE END IF 6. Search To search something in the screen, the optical mouse device needs to determine the sign of a pixel (positive or negative). This is done with a call to the IS-BACKGROUND or IS-OBJECT functions as defined in the Background and Object section above. A search algorithm can look like this:

4 FUNCTION FIND (VAR X, Y: INTEGER; VAR X-INCREMENT, Y-INCREMENT: INTEGER; VAR COUNT: INTEGER)—COUNT determine the maximum number of iterations—we can use to find the object WHILE COUNT>0—get the pixel at the position X, Y PIXEL=READ-PIXEL (X, Y)—check if the pixel is part of the object IF IS-OBJECT (PIXEL) THEN—we found the object, stop the search and—return the position at which the object—was found RETURN X, Y END IF—the object was not found yet—decrease the number of pixels to still be checked COUNT:=COUNT−1— define the next X coordinate to be checked—(note: X-INCREMENT can be negative to go from right to left) X:=X+X-INCREMENT—define the next Y coordinate to be checked—(note: Y-INCREMENT can be negative to go from bottom to top) Y:=Y+Y-INCREMENT END WHILE—return a position which can't be reached as a "no position"—in this example we use (−1, −1) RETURN−1, −1

In this FIND function we search an object. The opposite could be accomplished simply by changing the IS-OBJECT function call in IS-BACKGROUND. The variable COUNT is used to know how many pixels will be checked. The increment variables (X-INCREMENT and Y-INCREMENT) should be used with values larger than one (1) whenever possible so as to avoid testing many pixels.

7. Body

The first part we will search is the body of the object. The following is an algorithm to search a standing person. However, the optical mouse device may not be specifically based on such an object, it could be applied to a flying plane, an object attached at a ceiling, etc.

The search can be accomplished with the FIND function as defined in the Search section above. It will check one pixel every 20 pixels until the body is found or the whole screen has been searched. The position at which the body is found is put in variables for later use.

5 PROCEDURE FIND-BODY—define the STEP used to check pixels to find the body;—the STEP needs to change depending on the area and therefore—the size of the standing person;—20 is a good value for a full screen area STEP=20—compute the maximum number of left-right iterations within—the area to be searched MAX-TEST= (X-RIGHT−X-LEFT−LIMIT*2)/STEP—find the left position of the body FIND (X-LEFT+LIMIT, Y-BOTTOM−LIMIT, STEP, 0, MAX-TEST) RETURNING BODY-X-LEFT, BODY-Y-LEFT—here, we should check whether the body was found—when not, it—s a special case and no body will be—found searching from right to left so we could skip—the following call—to find the right position of the body we could also—search for the background going through the body instead—of searching from the other side of the screen (another—FIND function would be necessary)—find the right position of the body FIND (X-RIGHT−LIMIT, Y-BOTTOM−LIMIT, −STEP, 0, MAX-TEST) RETURNING BODY-X-RIGHT, BODY-Y-RIGHT In this algorithm the following is defined:

The variable STEP: sets the number of pixels to be skipped on each iteration; the use of a STEP value is important to make the search fast; in this example we defined the step as 20, so if we start searching at the position (10, 120), the second pixel tested will be found at the position (30, 120), the third at (50, 120), etc.

The variable MAX-TEST: it sets the number of pixels which can be tested left-right; we use the X-LEFT and X-RIGHT coordinates as defined above; the LIMIT*2 would be:

. . . (LEFT-LIMIT+RIGHT-LIMIT)

if the limits were specific on each side.

The call to the FIND function to look for the left side: starts the search at the position:

(X-LEFT+LIMIT, Y-BOTTOM−LIMIT)

which is at the bottom-left of the image. The function will continue the search increasing the X coordinate by STEP (Y is not changed). The second pixel tested (if the body was not found yet) is:

(X-LEFT+LIMIT+STEP, Y-BOTTOM−LIMIT)

The FIND function tests pixels until the body is found, or MAX-TEST pixels are checked. The result is then saved in the BODY-X-LEFT and BODY-Y-LEFT variables.

The call to the FIND function to look for the right side: starts the search at the position:

(X-RIGHT−LIMIT, Y-BOTTOM−LIMIT)

which is at the bottom-right of the image; the function will continue the search decreasing the X coordinate by STEP (Y is not changed). The second pixel tested (if the body was not found yet) is:

(X-RIGHT−LIMIT-STEP, Y-BOTTOM−LIMIT)

The FIND function tests pixels until the body is found, or MAX-TEST pixels are checked. The result is then saved in the BODY-X-RIGHT and BODY-Y-RIGHT variables.

8. Arms

Once the body has been found, a search for the arms 15 is conducted. See FIG. 3b. In the example shown, we start looking from the top of the searched area to avoid any problems with the shadow the person may display on the background. A too dark shadow would be seen as being positive (i.e. as part of the standing person).

The search of the arms is very similar to the search of the body. There is an example of algorithm to do so:

6 PROCEDURE FIND-ARMS—define the STEP used to check pixels to find the arm;—it is smaller than for the body because arms are smaller—the STEP needs to change depending on the area and therefore—the size of the standing person STEP=10—compute the maximum number of top-bottom iterations—within the area to be searched MAX-TEST=(Y-BOTTOM−Y-TOP−LIMIT*2)/STEP—find the position of the left arm FIND (BODY-X-LEFT−20, Y-TOP+LIMIT, 0, STEP, MAX-TEST) RETURNING ARM-X-LEFT, ARM-Y-LEFT—find the position of the right arm FIND (BODY-X-RIGHT+20, Y-TOP+LIMIT, 0, STEP, MAX-TEST RETURNING ARM-X-RIGHT, ARM-Y-RIGHT This algorithm is very similar to the one in the Body algorithm description above. Note that the step is now used to increment the Y coordinate (X is not changed). There should be a test, which does not appear here, to make sure both sides of the body were found. The search starts from BODY-X-LEFT−20 and BODY-X-RIGHT+20 to avoid searching for shoulders and arms along the body (i.e. obviously not pointing). The value of MAX-TEST could also be made smaller since the arms can not be lower than a certain point; the computation could be:

SEARCH-HEIGHT=Y-BOTTOM−Y-TOP−LIMIT*2MAX-TEST=SEARCH-HEIGHT*0.80/STEP where we use only 80% of SEARCH-HEIGHT so the lowest 20% of the searched area will not be checked for an arm. See FIG. 3b.

9. Pointing Device

Once arms are found, we can start searching for the tip 25 of the arm as shown in FIG. 3c. This search is more complicated, and can be accomplished checking inside the arm or around the arm. The algorithm presented here goes around the arm.

7 FUNCTION FIND-TIP (VAR X, Y: INTEGER; VAR X-DIRECTION: INTEGER; VAR STEP: INTEGER)—loop until a RETURN is reached LOOP FOREVER SAVED-X:=X SAVED-Y:=Y—move toward the tip of the arm X:=X+STEP*X-DIRECTION—clip the X position on the right IF X>=X-RIGHT−LIMIT THEN—no tip found (or found on the border . . . ) RETURN−1, −1 END IF—clip the X position on the left IF X<=X-LEFT+LIMIT THEN—no tip found (or found on the border . . . ) RETURN−1, −1 END IF—check the pixel, is it a background pixel? IF IS-BACKGROUND (X, Y) THEN—the loop ends with the UNTIL LOOP—move toward the bottom of the area Y:=Y+STEP—when we reach the bottom of the screen, we are "after"—the tip of the pointing device; so check for that case IF Y>=Y-BOTTOM−LIMIT THEN RETURN SAVED-X, SAVED-Y END IF—check going below UNTIL IS-OBJECT (X, Y)—keep the position outside the arm Y:=Y−STEP ELSE—the pixel on the left isn't a background pixel—therefore we need to go up instead of down to go—around it;—the loop ends with the UNTIL LOOP—move toward the top of the area Y:=Y−STEP—check whether we reached the top of the screen IF Y<=Y-TOP−LIMIT THEN—this case could be treated as a special case by—strong optical mouse devices as an arm touching—the top of the screen; yet in many cases the arm—can never reach such a place RETURN−1, −1 END IF UNTIL IS-BACKGROUND (X, Y) END IF—here we know we have a background pixel at (X, Y) END LOOP This first algorithm can be used to find the tip of one arm. The direction (X-DIRECTION) parameter can be used to search on the left (−1) or on the right (1) as described below.

Figure 3E:
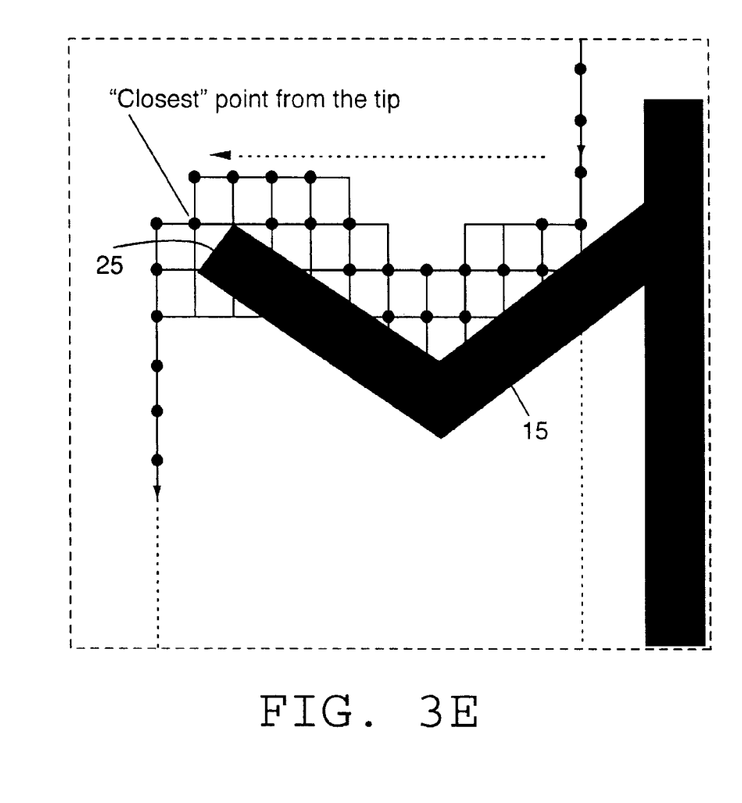
FIG. 3e shows a detailed search for the tip.

8 PROCEDURE FIND-POINTERS—search for the left pointing device with 5 pixels precision—(direction set to −1 and step to 5) FIND-TIP (ARM-X-LEFT, ARM-Y-LEFT−10, −1, 5) RETURNING TIP-X-LEFT, TIP-Y-LEFT—search for the left pointing device with 1 pixel precision—(direction set to −1 and step to 1) FIND-TIP (TIP-X-LEFT−5, TIP-Y-LEFT−5, −1, 1) RETURNING TIP-X-LEFT, TIP-Y-LEFT—search for the right pointing device with 5 pixels precision—(direction set to 1 and step to 5) FIND-TIP (ARM-X-RIGHT, ARM-Y-RIGHT−10, 1, 5) RETURNING TIP-X-RIGHT, TIP-Y-RIGHT—search for the right pointing device with 1 pixel precision—(direction set to 1 and step to 1) FIND-TIP (TIP-X-RIGHT−5, TIP-Y-RIGHT−5, 1, 1) RETURNING TIP-X-RIGHT, TOP-Y-RIGHT This last algorithm calls the FIND-TIP function which determines the tip of each arm. FIND-ARMS should check whether an arm was found before to search for its tips. The search is repeated twice. See FIG. 3e: (1) with a step of 5 which returns a point near the tip at about 5 pixels away and (2) with a step of 1 which returns a point next to the tip (i.e. which is at most 1 pixel away). This technique is only to enable to processing to occur substantially real time. Other techniques can be used to close up on the tip instead of a new call to FIND-TIP.

10. Left or Right?

When two pointing devices are found (one on the right 15 and one on the left 27), a simple distance algorithm is used to determine which one will be used. See FIG. 3d. Other algorithms could be used, like always force the left side or the right side to be picked.

9 FUNCTION SELECT-TIP IF BODY-X-LEFT−TIP-X-LEFT>TIP-X-RIGHT−BODY-X-RIGHT THEN RETURN TIP-X-LEFT, TIP-Y-LEFT ELSE RETURN TIP-X-RIGHT, TIP-Y-RIGHT END IF

Since it is known which variable which variable has the largest X coordinate, there is no need to use an absolute value function.

11. Body on the Border

Figure 4:
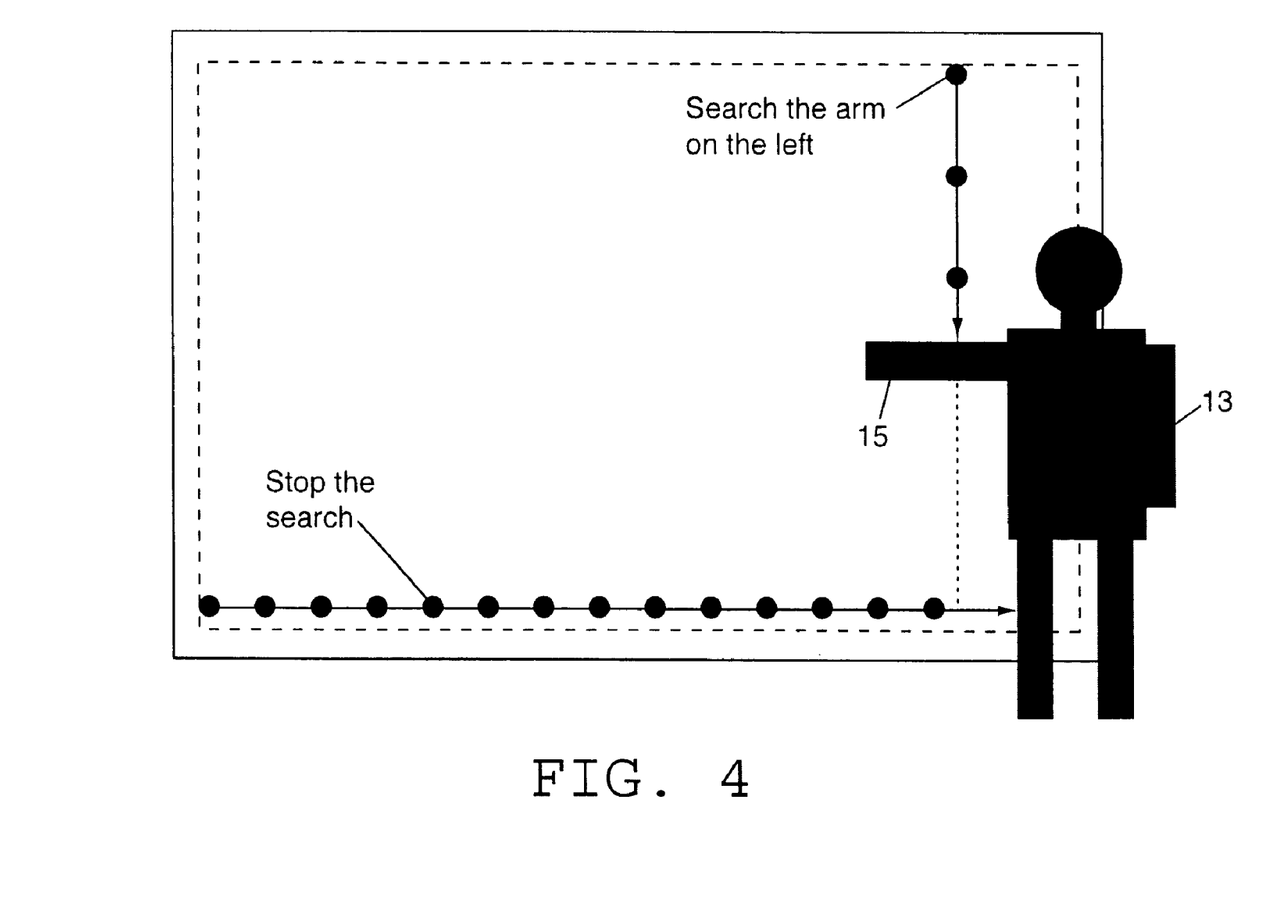
FIG. 4 shows a special case for a body and arm search.

There are two special cases when the body 13 is on the border of the screen. One when the body is on the right See FIG. 4 and one when the body is on the left. In both cases, a search is conducted for one arm 15. The search will be exactly the same as described above in the Body, Arms and Pointing Device algorithm.

The Body algorithm will usually return an unusable position for the search of the body when the person is standing on a border. A resulting position which is equal to the startup or the first position, can be declared as being an invalid position (i.e. the body is on that side).

The handling of this special case just means that one side of the body may not exist. Therefore, the Arms algorithm needs to search only one of the two arms and set the other arm position to a 'no position' status. Similarly, the Pointing Device algorithm needs to search the tip of only one arm.

An algorithm could look like this:

10—do some setup . . . —search for the body FIND-BODY—check if the left position is correct—(instead of 25, we should use the body STEP value) IF BODY-X-LEFT<X-LEFT+LIMIT+25 THEN—not a correct position—we didn't find the body here BODY-X-LEFT:=−1 BODY-Y-LEFT:=−1 END IF—check if the right position is correct IF BODY-X-RIGHT<Y-RIGHT−LIMIT−25 THEN—not a correct position—we didn't find the body here BODY-X-RIGHT:=−1 BODY-Y-RIGHT:=−1 END IF—check if one side wasn't found—search for only one arm IF BODY-X-LEFT=−1 AND BODY-Y-LEFT=−1 THEN IF BODY-X-RIGHT=−1 AND BODY-Y-RIGHT=−1 THEN—both sides weren't found—check for flying arms;—(see next point) FLYING-ARMS ELSE—the left side wasn't found—search the right arm only FIND-RIGHT-ARM END IF RETURN END IF IF BODY-X-RIGHT=−1 AND BODY-Y-RIGHT=−1 THEN—the right side wasn't found—search the left arm only FIND-LEFT-ARM RETURN END IF 12. No Body Found or the "Flying Arms"

Figure 5:
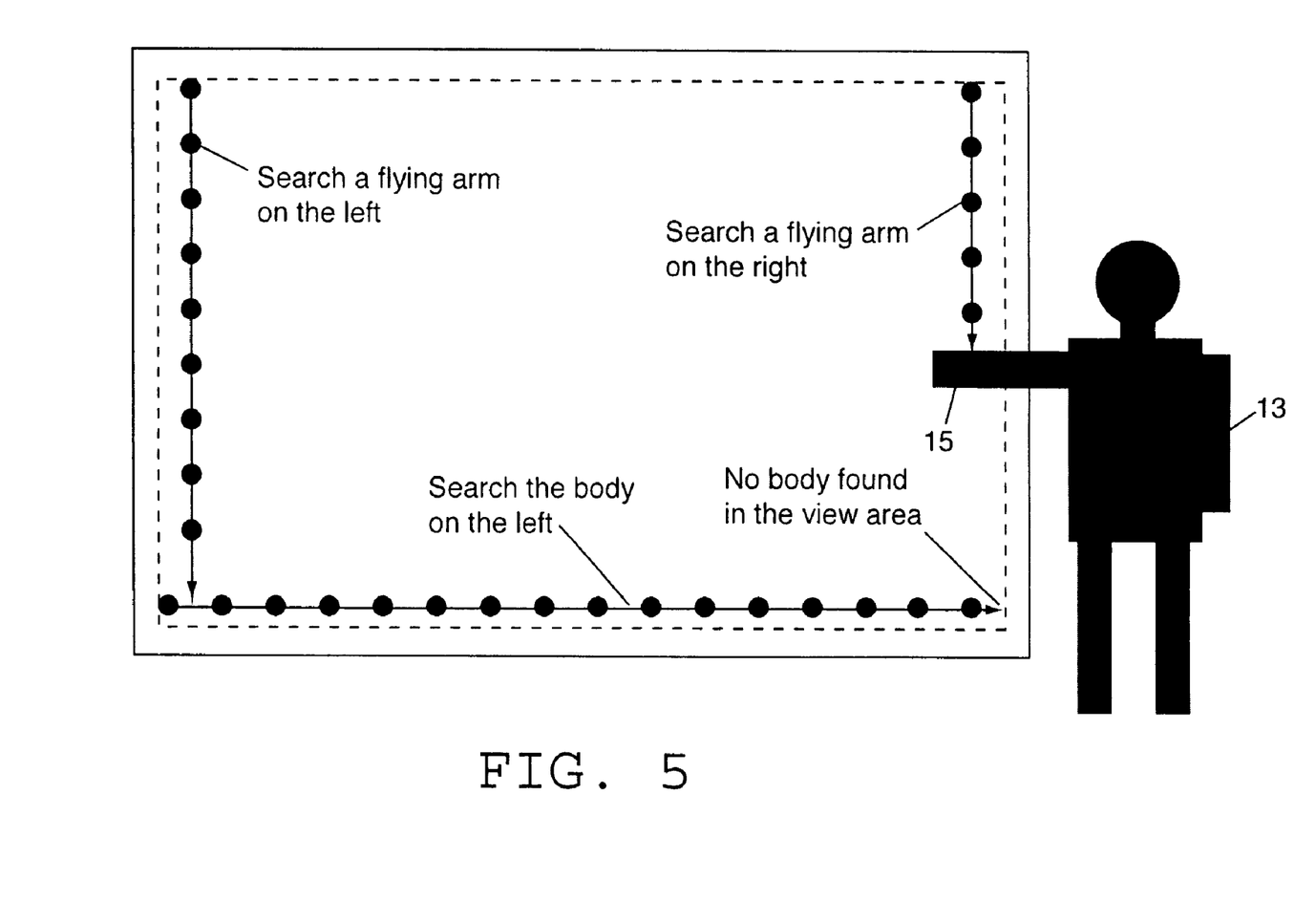
FIG. 5 shows a special case for an arm search.

This special case happens whenever the person is out of the video field but is still pointing to something within the video field as shown in FIG. 5. This special case occurs whenever the body 13 is not found at all in the area to be searched.

Once this special case is determined (like in the Body or the Border algorithm), a search for an arm (also called a flying arm) on the left is performed as if the body was just further left of the limit. Similarly, and if nothing is found on the left (limitation which is given here because a person cannot be on both side of a screen which is specific to this example of the optical mouse device) a check on the right is performed as if the body was just further right of the limit.

The following algorithm shows an example to do so:
PROCEDURE FLYING-ARMS
simulate a body on the right of the screen BODY-X-LEFT=X-RIGHT-LIMI-T BODY-Y-LEFT=Y-BOTTOM−LIMIT
simulate a body on the left of the screen BODY-X-RIGHT=X-LEFT+LIMIT BODY-Y-RIGHT=Y-BOTTOM−LIMIT
search for the arms FIND-ARMS
search for the pointing device FIND-POINTERS The FLYING-ARMS procedure sets all the body coordinates to fake positions as if a body had been found. Thus the FIND-ARMS procedure can be called to perform a search for two arms.

13. Nothing Found

In the event nothing is found (the area is only negative) the optical mouse device will return a "no position" value.

Because of the way it works, the optical mouse could be done to search for several areas in each image. This way, more than one pointing device could be found and managed; i.e. two persons could appear in the image: one on the left and one on the right.

What is claimed is:

1. A method for finding a pointing element within a digital image comprising the steps of:
   a) receiving a digitized image including a background and an object to be tracked, said background and said object having a different color;
   b) defining a rectangle within said image including at least a portion of said object;
   c) conducting a search within the defined rectangle starting at a position adjacent a first side of a bottom portion of said rectangle and continuing in a direction towards a second side of said rectangle until said object is located and storing a first x value corresponding thereto;
   d) conducting a second search within the defined rectangle starting at a position adjacent said second side of said bottom portion of said rectangle and continuing in a direction towards said first side of said rectangle until said object is located and storing a second x value corresponding thereto;
   e) conducting a third search within the defined rectangle starting at a position adjacent a top portion of said rectangle and offset from said first x value and continuing in a direction towards said bottom until said object is located and storing a first y value corresponding thereto;
   f) conducting a fourth search within the defined rectangle starting at a position adjacent said top portion of said rectangle and offset from said second x value and continuing in a direction towards said bottom until said object is located and storing a second y value corresponding thereto;
   g) conducting a fifth search using the stored first x and second x and first y and second y positions to find a point representing one of a leftmost and a rightmost position of said object and storing x and y coordinates corresponding to said found point.

* * * * *